(12) United States Patent
Anderson et al.

(10) Patent No.: US 9,091,596 B2
(45) Date of Patent: Jul. 28, 2015

(54) UV IRRADIANCE SENSOR WITH IMPROVED COSINE RESPONSE

(71) Applicant: Davis Instruments Corporation, Hayward, CA (US)

(72) Inventors: Richard C. Anderson, San Jose, CA (US); Robert C. Jameson, Danville, CA (US)

(73) Assignee: Davis Instruments Corporation, Hayward, CA (US)

( * ) Notice: Subject to any disclaimer, the term of this patent is extended or adjusted under 35 U.S.C. 154(b) by 0 days.

(21) Appl. No.: 14/456,887

(22) Filed: Aug. 11, 2014

(65) Prior Publication Data

US 2015/0041664 A1 Feb. 12, 2015

Related U.S. Application Data

(60) Provisional application No. 61/864,359, filed on Aug. 9, 2013.

(51) Int. Cl.
*G01J 1/42* (2006.01)
*G01J 1/02* (2006.01)
*G01J 1/04* (2006.01)

(52) U.S. Cl.
CPC ............... *G01J 1/429* (2013.01); *G01J 1/0271* (2013.01); *G01J 1/0474* (2013.01); *G01J 2001/0485* (2013.01)

(58) Field of Classification Search
CPC ........................................................ G01J 1/429
See application file for complete search history.

(56) References Cited

U.S. PATENT DOCUMENTS

| 2004/0113089 A1* | 6/2004 | Janos et al. ................... 250/372 |
| 2007/0023609 A1* | 2/2007 | Moon ......................... 250/203.4 |

\* cited by examiner

*Primary Examiner* — David Porta
*Assistant Examiner* — Faye Boosalis
(74) *Attorney, Agent, or Firm* — Kilpatrick Townsend & Stockton, LLP

(57) ABSTRACT

A sensor housing and cosine diffuser are provided for the detection and measurement of ultraviolet (UV) irradiance. The cosine diffuser has a tiered structure to efficiently receive and transmit incident light that passes over and/or through the sensor housing structure. The sensor housing structure can be configured to have an irregular, serrated, castellated, and or repeating prong and/or tooth sequence to form a cutoff comb, through which incident light is attenuated. The attenuation of light in turn reduces measurement error caused when too much or too little incident light, relative to the actual intensity and irradiance of ambient incident light, reaches and transmits through a cosine diffuser due to the variation of the zenith angle of incident light over the course of a day.

18 Claims, 14 Drawing Sheets

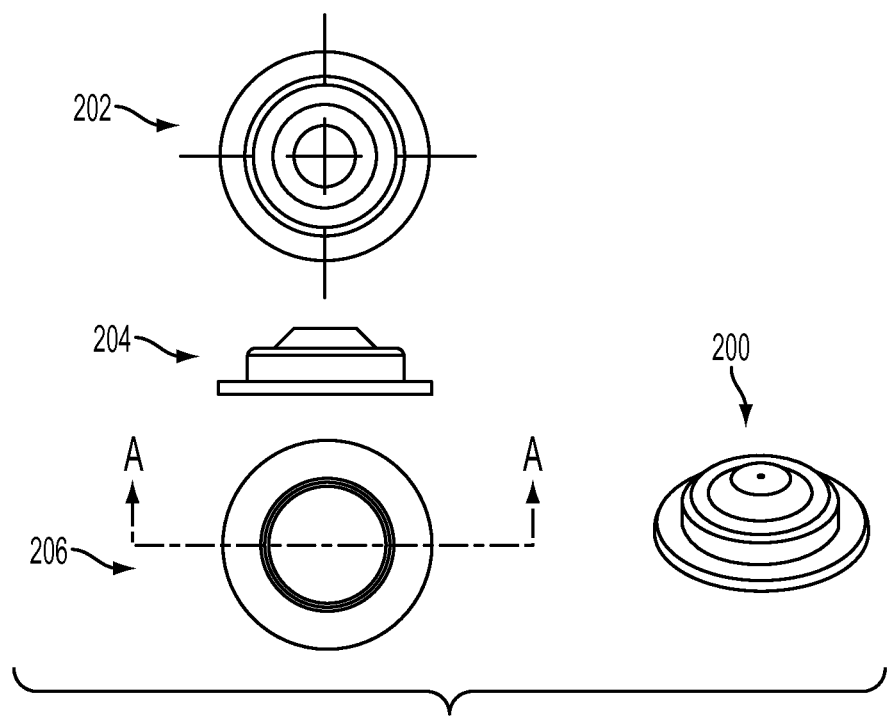
FIG. 2
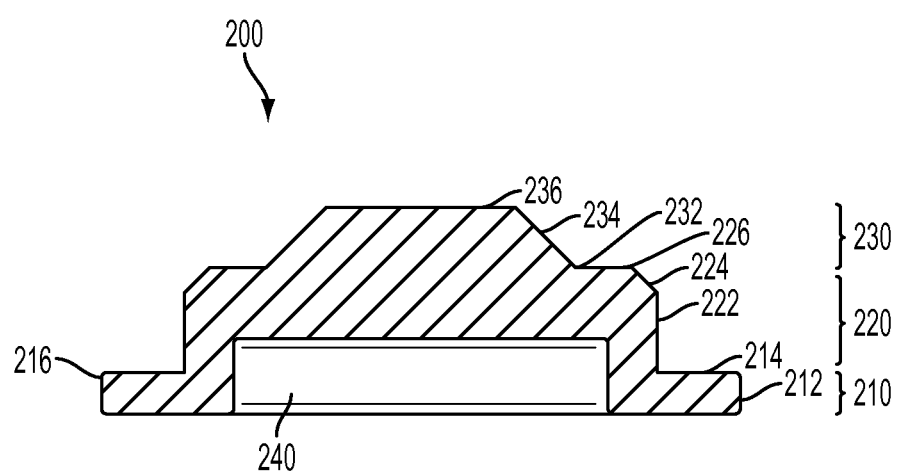
FIG. 2.1

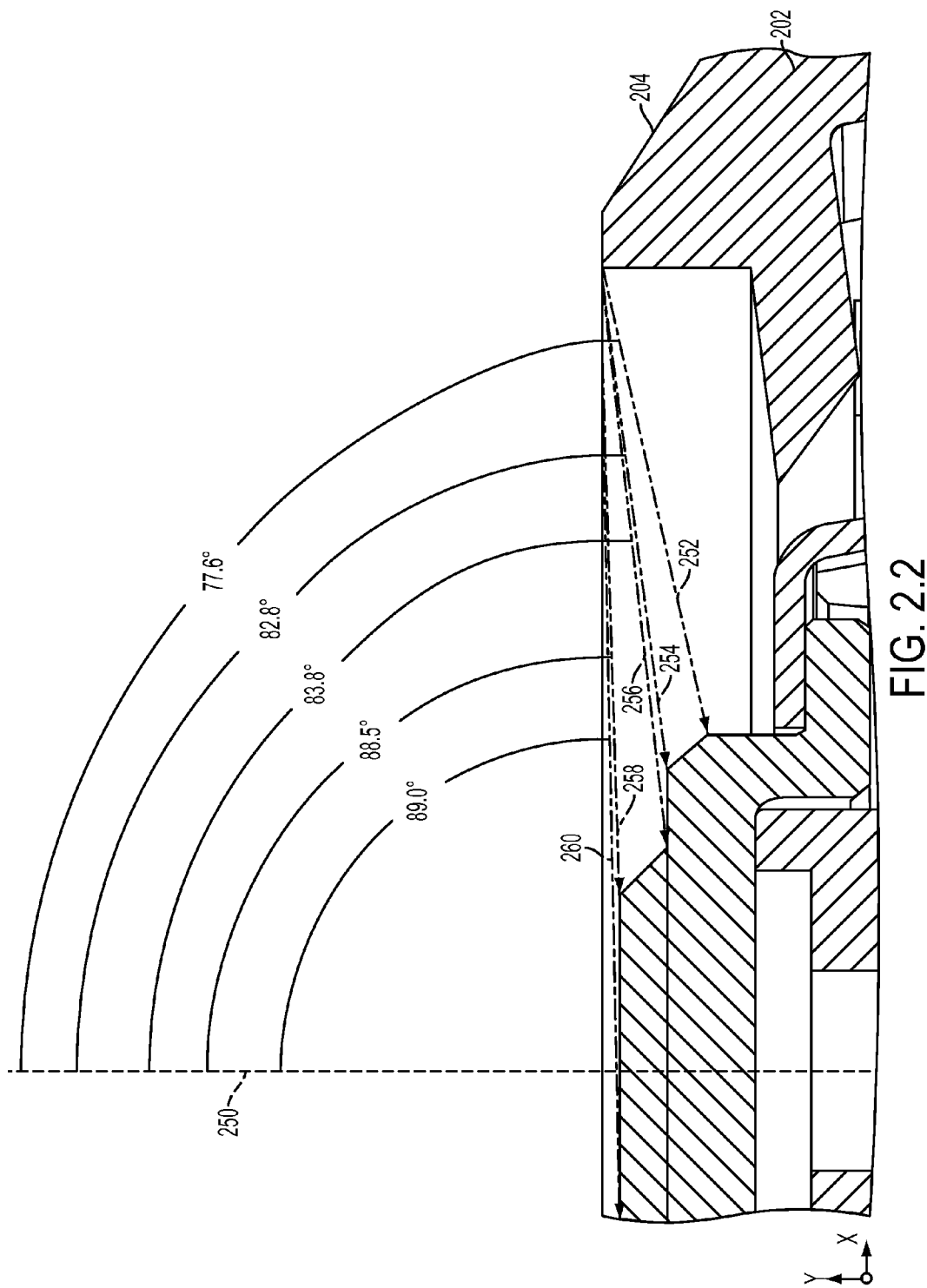
FIG. 2.2

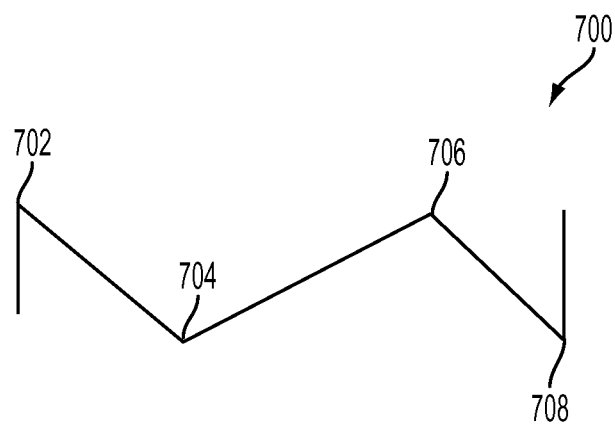
FIG. 7.1
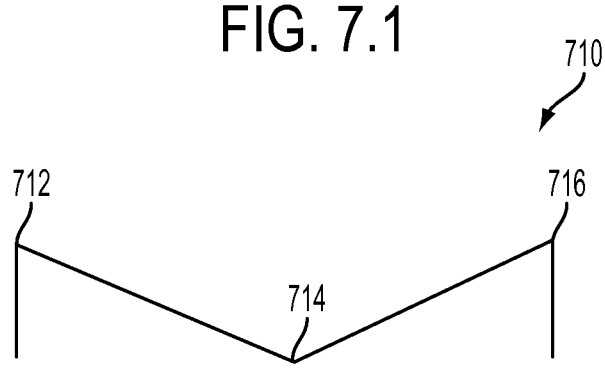
FIG. 7.2
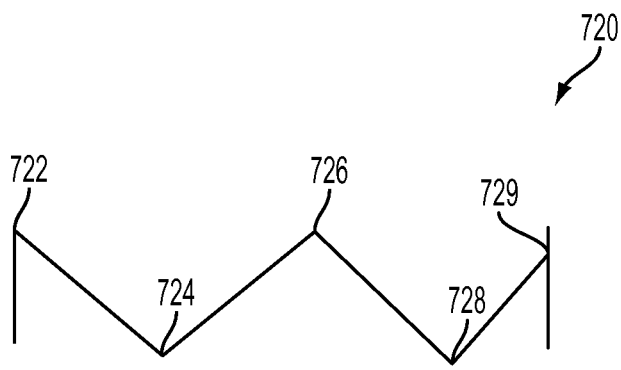
FIG. 7.3

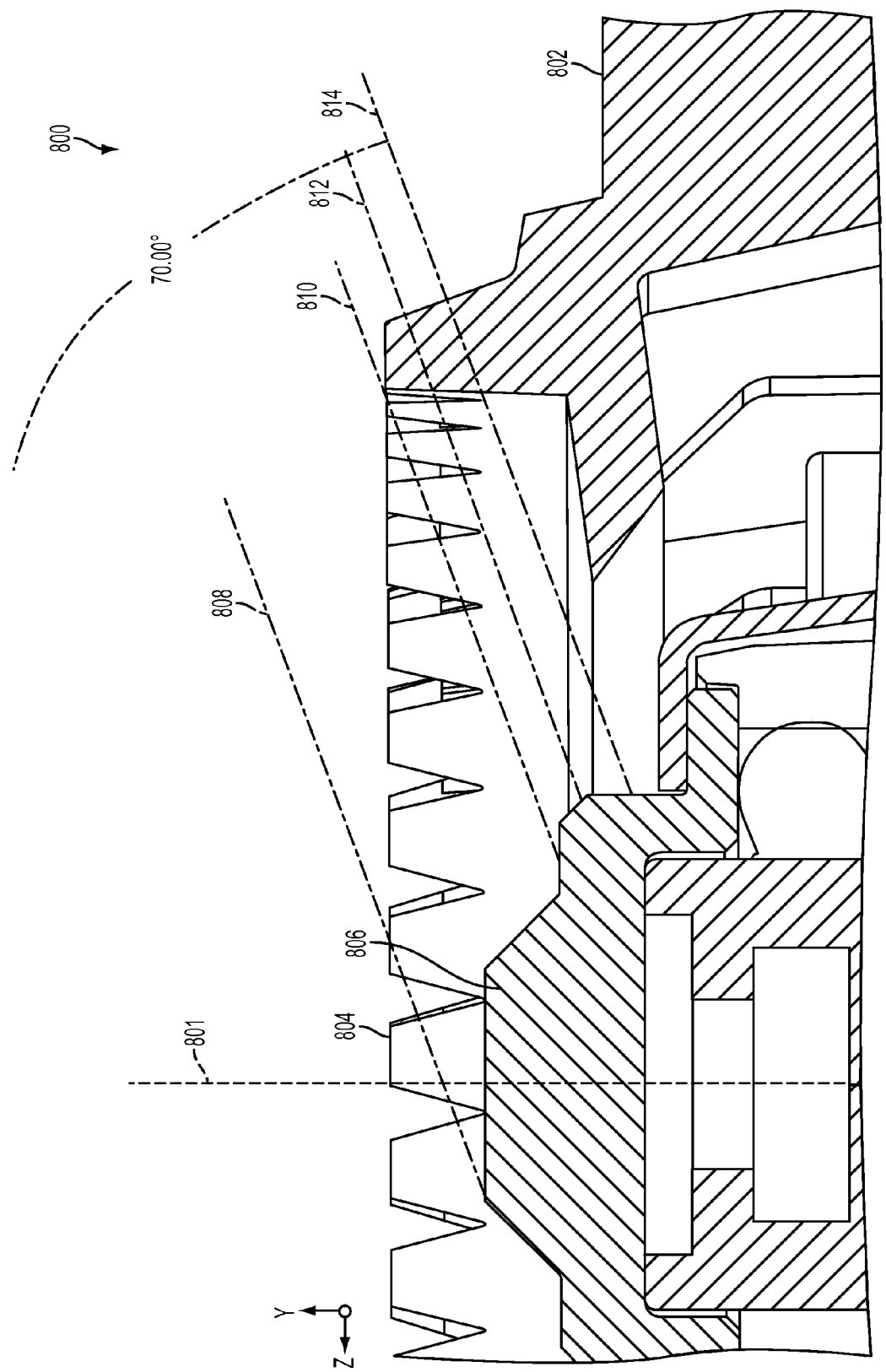

UV IRRADIANCE SENSOR WITH IMPROVED COSINE RESPONSE

CROSS-REFERENCE TO RELATED APPLICATION

The present application claims priority to U.S. Provisional Patent Application No. 61/864,359, filed on Aug. 9, 2013, the entirety of which is hereby incorporated by reference.

FIELD OF THE INVENTION

The present invention relates to the control of light incident on an irradiance measuring device. More particularly, the present invention relates to the control of light incident on an ultraviolet (UV) irradiance measuring device so as to maintain an accurate cosine response from all zenith angles ($\Theta$), and as the zenith angle of incident light changes.

BACKGROUND OF THE INVENTION

Ultraviolet (UV) radiation is light which has a wavelength ($\lambda$) range of 400-100 nm and an energy per photon of 3.10 to 12.4 eV. The UV spectrum is commonly subdivided into three narrower ranges: the Ultraviolet A (UVA) range, characterized as long wave or black light, which has a wavelength range of 400-315 nm and an energy per photon of 3.10 to 3.94 eV; the Ultraviolet B (UVB) range characterized as medium wave, which has a wavelength range of 315-280 nm and an energy per photon of 3.94 to 4.43 eV; and the Ultraviolet C (UVC) range, characterized as shore wave or germicidal, which has a wavelength rage of 280-100 nm and an energy per photon of 4.43 an 12.4 eV. It is beneficial to know the amount of UV radiation due to the effect of UV radiation on living organisms. For example, UVB exposure induces the production of vitamin D in the skin of humans and a lack of exposure to UVB may lead to a lack of vitamin D. Conversely, an excess of UVB exposure can lead to direct DNA damage, sunburn, and skin cancer. Similarly, UVC can cause adverse effects that can variously be mutagenic or carcinogenic. In humans, prolonged exposure to solar UV radiation may result in acute and chronic health effects on the skin, eyes, and immune system.

To make a measurement of irradiance, it is required by definition that the response to each ray of radiation be proportional to the cosine of the angle of incidence of that ray. The ideal sensor will give a full response for rays striking the sensor perpendicularly (normal to the surface angle, 0° angle of incidence, 0° zenith angle) and conversely will give zero response for rays coming from the horizon (90° angle of incidence, 90° zenith angle). The ideal sensor will give a fifty percent (50%) response for incident rays with 60° zenith angle. For such sensors, also referred to as pyranometers, it is often useful to take measurements of light, and particularly of ultraviolet light, to determine whether concentrations of UV light are of an intensity which may be harmful. These sensors, however, must be placed in locations where incident radiation effects can introduce error into the desired measurement. In particular, errors may be introduced due to the zenith angle of light changing. Taking the vertical direction normal to the sensor as an zenith angle ($\Theta$) equal to 0°, as the zenith angle increases and cosine $\Theta$ approaches zero, the side wall of a photosensor continues to admit light, causing a large positive cosine error relative to the measured intensity. To mitigate against this error, previous applications have used a "cutoff ring" to block light as $\Theta$ approaches 90°. The limitation of the cutoff ring is that the blocking of the light tends to be too abrupt, which can lead to irregular and erroneous measurements.

The previous applications have further tried to mitigate against such errors through use of simple light diffusers which make the intensity of light reaching a photosensor relatively uniform, but such efforts retain inaccuracies. Accordingly, there is a need in the field for an invention that can measure UV irradiance with a minimum of zenith angle cosine error stemming from structural limitations.

BRIEF SUMMARY OF THE INVENTION

A weather station may include several sensors to monitor, measure, record, and/or transmit desired weather parameters, including but not limited to temperature, humidity, light intensity, and the like. In embodiments of the present invention, the weather station includes a UV light sensor (e.g. a transducer) located within, and protected by, a sensor housing structure. The light that reaches the UV sensor enters through the top of the station and sensor and has to pass through a diffuser. The diffuser operates to normalize the light that is incident on the UV sensor, such that the light incident on the UV sensor is not biased toward one part of the sensor due to the position of the sun and angle of the light incident on the station. In other words, the light intensity of each ray reaching a transducer is proportional to the cosine of the angle of incidence of the related zenith angle.

The "cosine response" of a light sensor may be defined as the manner in which the measurement of the incident light by a sensor varies as a function of the zenith angle ($\Theta$) of the light. That is to say, radiation incident on a flat horizontal surface at a defined zenith angle will give a measurement result proportional to the cosine of that zenith angle. When the value measured for light rays at $\Theta=0°$ is defined as 1 (unity), the ideal sensor will report that the value for all angles of $\Theta$ from 0° to ±90° is equal to cosine $\Theta$, i.e. the photosensor will have a vertical directional response which is exactly the same as the cosine response. However, the directional response of a sensor is influenced by the quality, dimensions, and construction of the sensor.

As used herein a "cosine diffuser" refers to a material that, when struck on a surface by UV radiation from a plurality of light paths, scatters, and thus diffuses, the radiation exiting the material toward the sensing element (e.g. a transducer) has an intensity that is proportional, with minimum error, to the cosine of the zenith angle of that ray when it reached the diffuser. The material forming the cosine diffuser may also be shaped to present multiple surfaces to incident UV radiation and light.

In many embodiments, a sensor housing is provided which has a molding shaped to have an interior space with which to shield a UV sensor, in which the molding has an upper opening which is configured to have a cosine diffuser situated therein. In some embodiments, the molding can have a ridge in the opening, such when a cosine diffuser is situated in the upper opening of the molding, and where the ridge has a serrated structure such that a first plane of the ridge is relatively higher than an uppermost portion of the cosine diffuser and a second plane of the ridge is relatively lower than an uppermost portion of the cosine diffuser, and a cosine diffuser. In other embodiments, the cosine diffuser has a high-angle tier, through which incident light enters a cosine diffuser at zenith angles of about 90° or less, the zenith angle determined relative to normal from a major surface area of the cosine diffuser, a low-angle tier, through which incident light enters the cosine diffuser at zenith angles of about 75° degrees or less, a base tier, though which incident light enters the cosine diffuse at zenith angles of about 70° or less, a sensor cavity, though which light which has entered the cosine diffuser egresses from the cosine diffuser, and where the cosine diffuser is situated within the upper opening of the sensor housing molding.

In many embodiments, a sensor housing for an ultraviolet (UV) sensor system is provided, in which a molding is shaped to have an interior space with which to shield a UV sensor, the molding having an upper opening which is configured to have a cosine diffuser situated therein, where the ridge of the upper opening has a serrated structure, such that when a cosine diffuser is situated in the upper opening of the molding, the uppermost plane of the serrated structure is relatively higher than an uppermost portion of the cosine diffuser.

In many embodiments, a sensor housing for a ultraviolet (UV) sensor can have a sensor cavity which is configured to accommodate a photosensor. In some aspects, the sensor housing molding is shaped to have an interior space with which to shield a UV sensor. In other aspects, the sensor housing molding upper opening is shaped to have a ridge with a serrated structure. In some such aspects, the ridge can be a serrated structure is a cutoff comb, where the cutoff comb can have either or both of a sawtooth structure and a prong and slit structure. In further aspects, the sensor housing molding can be configured such that when the cosine diffuser is situated in the upper opening of the sensor housing molding, a first plane of the ridge is relatively higher than an uppermost portion of the cosine diffuser and a second plane of the ridge is relatively lower than the uppermost portion of the cosine diffuser.

In many embodiments, a cosine diffuser for an ultraviolet (UV) sensor system is provided, having a high-angle tier, through which incident light enters a cosine diffuser at zenith angles of about 90° or less, the zenith angle determined relative to normal from a major surface area of the cosine diffuser, a low-angle tier, through which incident light enters the cosine diffuser at zenith angles of about 75° degrees or less, a base tier, though which incident light enters the cosine diffuse at zenith angles of about 70° or less, and a sensor cavity, though which light which has entered the cosine diffuser egresses from the cosine diffuser.

BRIEF DESCRIPTION OF THE DRAWINGS

Illustrative aspects of the present disclosure are described in detail below with reference to the following drawing figures.

FIG. 2 is design schematic showing perspectives of a cosine diffuser element, according to many embodiments.

FIG. 2.1 is a cross-sectional design schematic of a cosine diffuser element, according to many embodiments.

FIG. 2.2 is a detailed illustration of a cosine diffuser element, according to many embodiments, situated in a housing of a weather station module, according to many embodiments.

FIGS. 7.1, 7.2, and 7.3 are illustrations of segments of a cutoff comb modification to a cutoff ring, where the comb has a sawtooth structure, according to many embodiments.

FIG. 8 is a detailed illustration of a weather station module sensor housing cutoff ring structure, according to many embodiments.

DETAILED DESCRIPTION OF THE INVENTION

Throughout this description for the purposes of explanation, numerous specific details are set forth in order to provide a thorough understanding of the many embodiments disclosed herein. It will be apparent, however, to one skilled in the art that the many embodiments may be practiced without some of these specific details. In other instances, well-known structures and devices are shown in diagram or schematic form to avoid obscuring the underlying principles of the described embodiments.

As used in this disclosure, the word "sensor" describes that portion of a weather instrument that directly measures the desired weather parameter, such as UV light intensity. It does not necessarily refer to the rest of the weather instrument, or a non-transitory computer readable medium for processing and conversion of the analog data at the sensor to a digital readout provided to a user.

In many embodiments, the sensor housing is constructed from UV-resistant acrylonitrile butadiene styrene ("ABS"), which can be specifically be Chi Mei Polylac® PA-757 ABS, and black in color. In many embodiments, the nominal thickness for each molded surface, e.g. the walls of the sensor housing, unless otherwise specified, is 0.060±0.005 inches. In further embodiments, the sensor housing is configured to house a UV sensor as part of a module, which can be part of a larger multi-sensored weather station.

Figure 1:
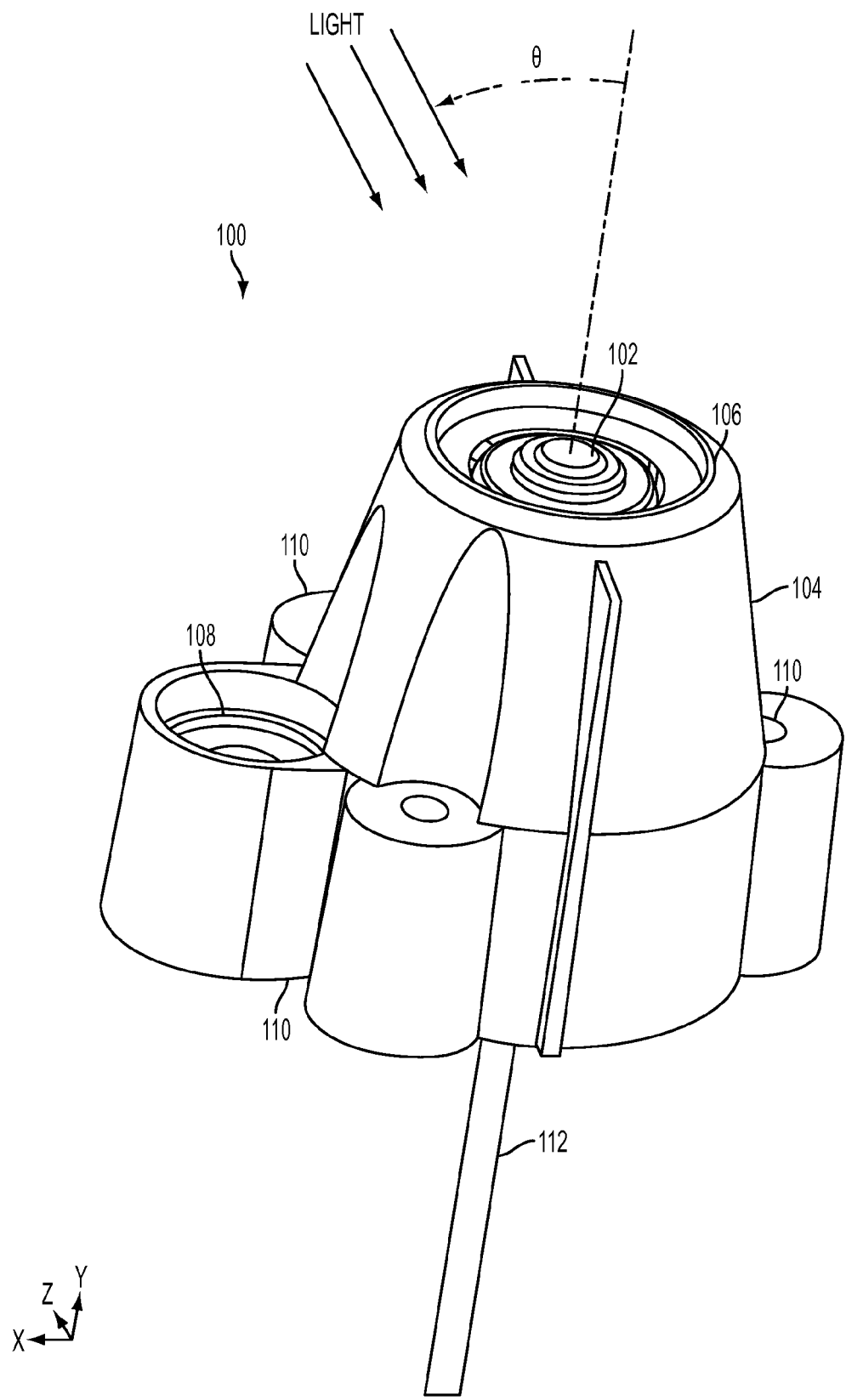
FIG. 1 is an illustration of a cosine diffuser element situated within a sensor housing for a weather station module, according to many embodiments.

FIG. 1 is an illustration of a sensor housing containing a tiered cosine diffuser in a weather sensor station module 100 according to an embodiment of the invention. The tiered cosine diffuser 102 is located within an opening of the sensor housing 104, the tiered cosine diffuser 102 and opening being oriented to the top of the sensor housing 104 in order to be exposed to the sun and receptive to light. The tiered cosine diffuser 102 is positioned within the sensor housing 104 such that it is relatively lower than a cutoff ring 106, which is a ridge formed by the top surface of the sensor housing 104. A secondary mounting 108 is present to allow for the mounting of sensors on the weather sensor station module 100 that require direct exposure to environmental conditions, or to hold a bubble level to allow a user to level the weather sensor station 100. In embodiments of the weather sensor station, at least three mounting points 110 are present for securing the sensor station module 100 to a structure in the environment where weather monitoring is to be performed. Embodiments of the sensor station may also have a UV sensor cable 112 that connects a UV sensor within the sensor station module 100 to a computer-readable media which can store, report, and/or analyze data collected by the UV sensor within the weather sensor station module 100. In embodiments of the sensor station, the UV sensor is a transducer that is a semiconductor photo diode that only responds to radiation in the region of interest, i.e. in the UV wavelengths.

A cosine diffuser according to many embodiments is structured to have multiple tiers which controls the amount of light allowed through the translucent cosine diffuser such that the light transmitted follows the cosine response as the zenith angle increases. In some embodiments, the diffuser may be constructed of Teflon or any other appropriate diffusive material. FIG. 2 is design schematic showing perspectives of a cosine diffuser element 200, particularly showing a top view 202, a side elevational view 204, and a bottom view 206, where the bottom view 206 indicates with line A-A the location of the cross-sectional view for FIG. 2.1.

An embodiment of the cosine diffuser in FIG. 2.1 shows a circular and tiered cosine diffuser 200 with a base tier 210, a low-angle-tier 220, a high-angle tier 230, and a transmission cavity 240 (alternatively referred to as a sensor cavity). The tiers are concentric circles positioned in order of decreasing diameter, in increasing distance from the UV sensor positioned below the tiered cosine diffuser 200 in many embodiments. The base tier 210 has a base tier side surface 212 which, measured from the bottom of the cosine diffuser 200, has a height of 0.038±0.005 inches, which also correlates to the thickness of the base tier 210. The base tier 210 has a base tier top surface 214 which has a width, from the base of the low-angle tier 220 to the edge of the base tier 210, of about 0.027 inches. The diameter of the base tier 210 is 0.580±0.002 inches. The corner of the base tier where the base tier side surface 212 meets the base tier top surface can be sloped, this base tier sloped surface 216 oriented at a 45°±5° angle between the substantively vertical base tier side surface 212 and the substantively horizontal base tier top surface 214, the base tier sloped surface 216 having a length of about 0.007 inches.

The low-angle tier 220 of the cosine diffuser 200 has a low-angle tier ("LAT") side surface 222, a LAT sloped surface 224, and a LAT top surface 226. The low-angle tier 220 can have a diameter of about 0.420 to about 0.428 inches, with a preferred diameter of about 0.426 inches. The LAT side surface 222 can have a height, measured from the point of intersection with the base tier 210, of 0.092±0.005 inches. The low-angle tier 220 has a LAT top surface 226 which has a width, from the base of the high-angle tier 230 to the edge of the low-angle tier 220 (the edge defined as the substantively vertical plane of the LAT side surface 222) of about 0.142±0.005 inches. The LAT sloped surface 224 can be oriented at a 45°±5° angle between the substantively vertical LAT side surface 222 and the substantively horizontal LAT top surface 226, the LAT sloped surface 224 having a length of about 0.025±0.005 inches.

The high-angle tier 230 of the cosine diffuser 200 has a high-angle tier ("HAT") sloped surface 234, and a HAT top surface 236. The point at which the HAT sloped surface 234 and the LAT top surface 226 intersect is identified as the LAT/HAT interface 232. The high-angle tier 220 can have a diameter of 0.280±0.005 inches, while the HAT top surface 236, also having a circular shape, can have a diameter of 0.170±0.005 inches. The high-angle tier can have a height (and corresponding thickness), measured from LAT/HAT interface 232 to the plane of the HAT top surface 236, of 0.055±0.002 inches. The HAT sloped surface 234 can be oriented at a 45°±5° angle between the substantively horizontal LAT top surface 226 and the substantively horizontal HAT top surface 236, the HAT sloped surface 234 and having a length of about 0.137±0.005 inches.

The transmission cavity 240 is a cavity extending from the bottom side of the base tier 210 into the interior of the tiered cosine diffuser 200, which can also have a circular shape, concentric with the base tier 210, low-angle tier 220, and high-angle tier 230. The transmission cavity 240 is located on the side of the tiered cosine diffuser 200 proximate to a UV sensor, which in many embodiments, is positioned beneath the tiered cosine diffuser within a weather station sensor housing. The transmission cavity 240 can have a diameter of 0.340±0.005 inches and a depth, measured from the bottom of the base tier 210, of 0.070±0.005 inches. Accordingly, the depth of the transmission cavity 240 can be greater than the height of the base tier 210, which means that the transmission cavity 240 can extend through the interior volume of the base tier 210 into the interior volume of the low-angle tier 220. A UV sensor positioned below the tiered cosine diffuser 200 may be within the volume transmission cavity 204 in physical contact with the tiered cosine diffuser 200, within the volume transmission cavity 204 but not in physical contact with the tiered cosine diffuser 200, or below the volume transmission cavity 204.

In FIG. 2.2, defining the direction normal 250 to the primary plane of the tiered cosine diffuser 200 as Θ=0°, as the zenith angle of the incident light increases, the light incident on the tiered cosine diffuser 200 reaches progressively fewer surfaces of the tiered cosine diffuser 200 residing within the sensor housing 202. When Θ=77.6°, the incident light is blocked by the cutoff ring 204 such that the lowest point on the tiered cosine diffuser 200 exposed to direct light is the point indicated by light path 252. This means that less light reaches the tiered cosine diffuser 200 (i.e. the surface area below light path 252) thus the amount of light reaching a UV sensor positioned below the tiered cosine diffuser in the sensor housing 202 receives less light. When Θ=82.8°, the incident light is blocked by the cutoff ring 204 such that the lowest point on the tiered cosine diffuser 200 exposed to direct light is the point indicated by light path 254, with proportionally less light reaching a corresponding UV sensor. When Θ=83.8°, the incident light is blocked by the cutoff ring 204 such that the lowest point on the tiered cosine diffuser 200 exposed to direct light is the point indicated by light path 256, with proportionally less light reaching a corresponding UV sensor. When Θ=88.5°, the incident light is blocked by the cutoff ring 204 such that the lowest point on the tiered cosine diffuser 200 exposed to direct light is the point indicated by light path 258, with proportionally less light reaching a corresponding UV sensor. When Θ=89.0°, the incident light is blocked by the cutoff ring 204 such that the lowest point on the tiered cosine diffuser 200 exposed to direct light is the point indicated by light path 260, with proportionally less light reaching a corresponding UV sensor.

It will be appreciated that embodiments of the disclosed cosine diffuser may also have additional intermediary tiers above, in between, or below, the low-angle tier 220, high-angle tier 230, and base tier 210. Moreover, the transmission cavity 240 may be designed to extend deeper into the interior of the tiered cosine diffuser 200, or to have a cavity more than one section with different diameters and depths. In further embodiments, a portion of the tiered cosine diffuser 200, such as the base tier 210, may be covered by a structure securing the tiered cosine diffuser 200 within in a sensor housing. In such embodiments, the base tier 210 is not exposed to incident light regardless of zenith angle and does not contribute to the transmission of light through the tiered cosine diffuser 200.

In various aspects, it can be understood that for a cosine diffuser as disclosed, incident light can enter the high-angle tier of the cosine diffuser at a first range of zenith angles, incident light can enter the a low-angle tier of the cosine diffuser at a second range of zenith angles, and incident light can enter the base tier of the cosine diffuser at third range of zenith angles. In other aspects, the cosine diffuser includes a sensor cavity, which can accommodate a photosensor, and though which light which has entered the cosine diffuser egresses from the cosine diffuser. In further aspects, a cosine diffuser can have transmission characteristic that is independent of the azimuth angle of incident light.

Figure 3:
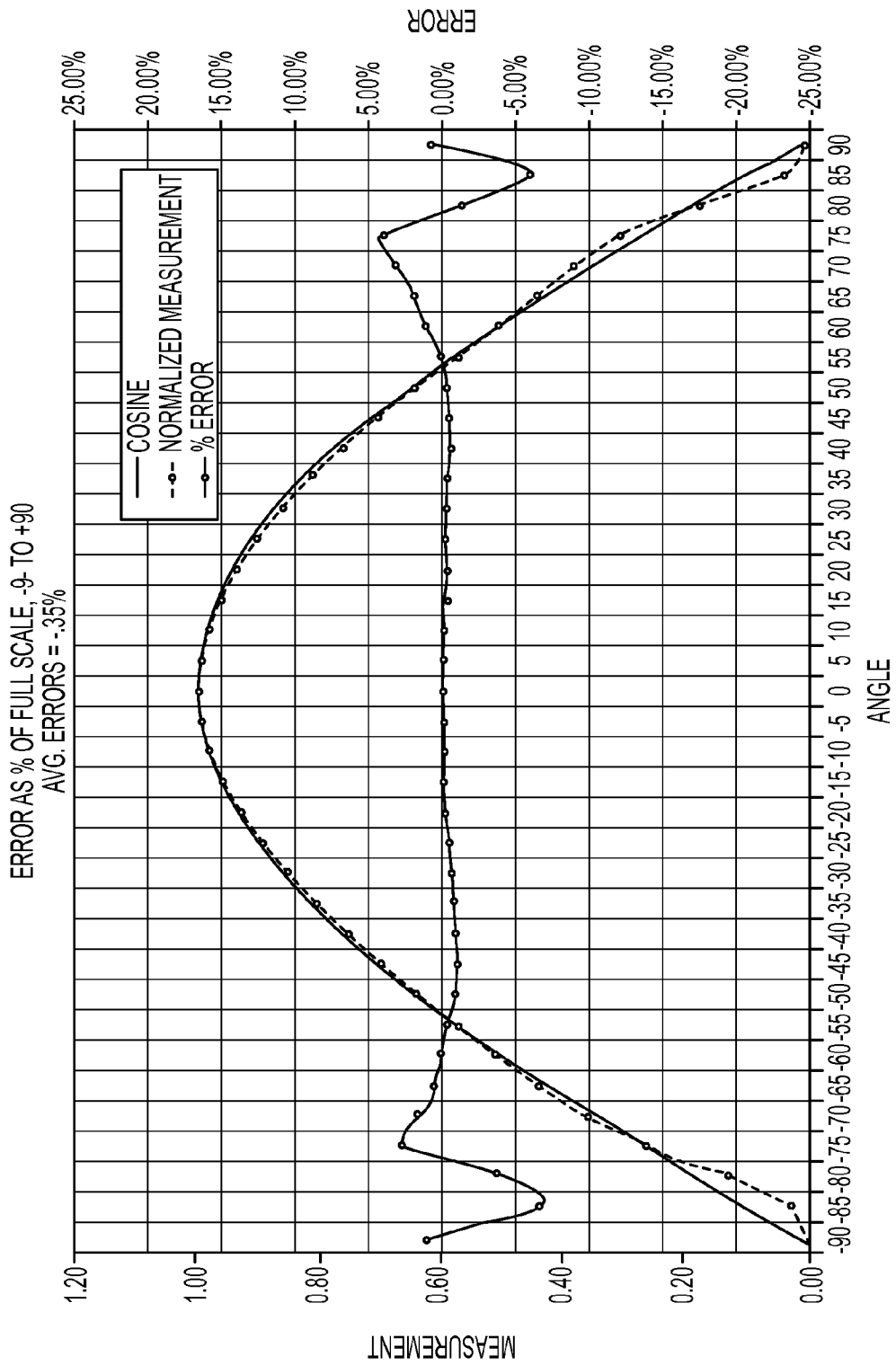
FIG. 3 is a graph comparing the percentage of error in UV light measurement of a cosine diffuser according to the embodiment shown in FIG. 2.2 as compared to an ideal cosine response.

FIG. 3 is a graph illustrating a comparison of the cosine response between a cosine diffuser according to the embodiment shown in FIG. 2.2 and an ideal cosine response, as well as the percentage of error in measured UV light measurement. The measurement on the right side y-axis of the graph shows the percentage of error in UV light measurement. The measurement on the left side y-axis of the graph shows a normalized measurement of the intensity (i.e. irradiance) of the light by a UV sensor, the measured light having passed through a cosine diffuse according to an embodiment of the invention. The intensity is shown on a scale from 0.00 to 1.20 normalized to the peak value of the irradiance of the light. As evident from the graph, starting at an zenith angle of about 60° (viewed from either a positive or negative angle side), the amount of light received by the UV sensor is greater than the expected light that should be observed, creating an increasing false-positive error. This false positive error continues to increase to about 4.5% until around about Θ=75°, where at this point, the cutoff ring begins to physically block the incident light from reaching the surfaces of the cosine diffuser. However, in part because the cutoff is abrupt, the amount of light sensed by the UV sensor quickly falls, and the corresponding measurement similarly quickly falls from being a false-positive error value (measuring more light than actually present) to a measuring a erroneously low value, a false-negative error of about negative 7%. The average error, as a percentage of the full range of zenith angles from −90° to 90°, is an error of about negative 0.35%. This error is, as evident, more pronounced and more problematic at the extremes of the angle range.

In many embodiments, the cutoff ring of the sensor housing is designed and configured to mitigate against erroneous measurements of light by manipulating the amount of light that reaches a cosine diffuser. Such embodiments can use a comb structure where an irregular, serrated, castellated, and or repeating prong and tooth sequence obstructs and thus attenuates incident light from reaching a cosine diffuser resting within the sensor housing. Some embodiments may be distinguished from diffraction gratings, as the irregularity of the obstructions are of a dimensional scale significantly larger than the wavelength of visible or UV light. Thus, while embodiments of cutoff combs may attenuate incident light, they do not necessarily cause light to diffract on a scale close to the wavelength of the incident light.

Figure 4:
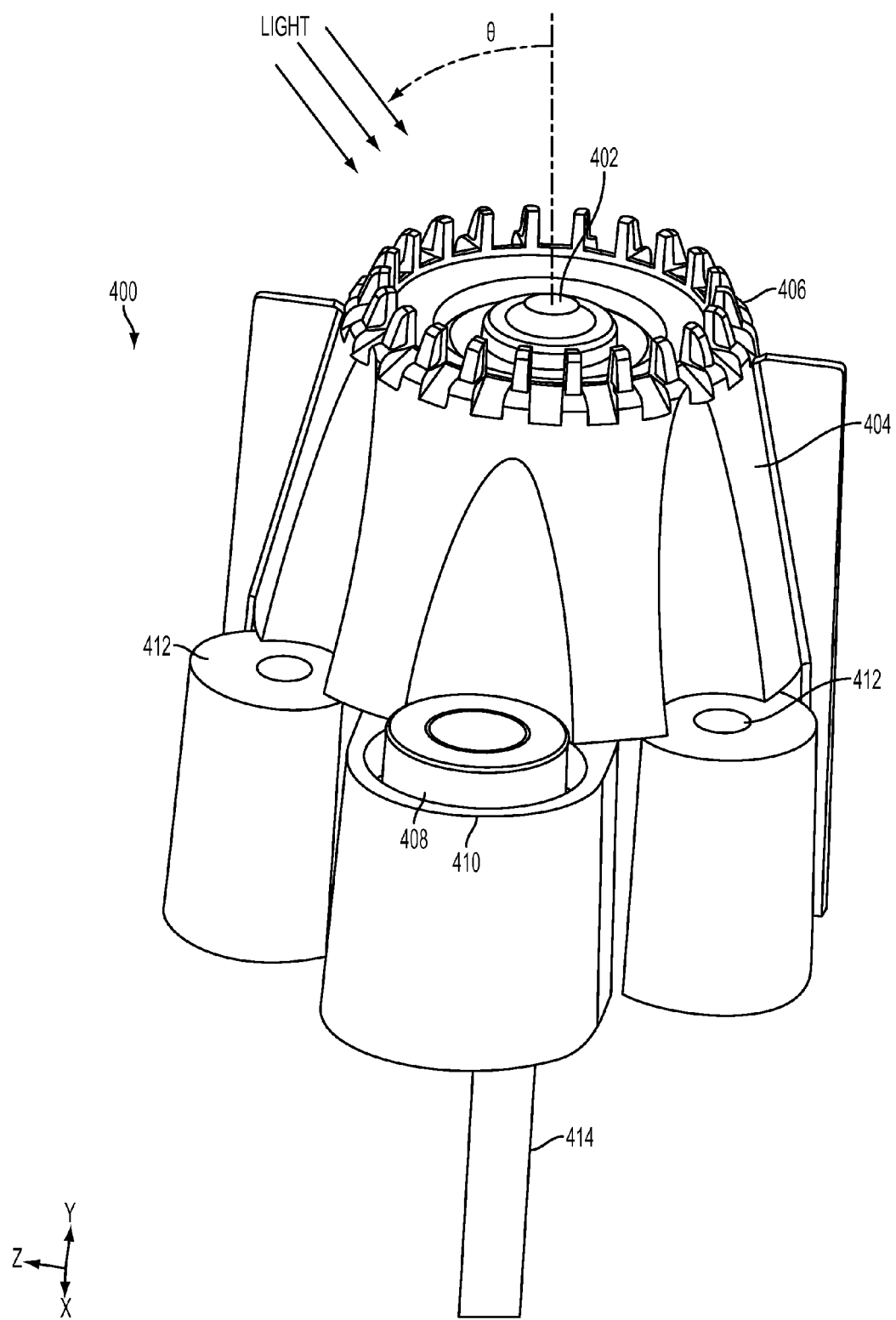
FIG. 4 is an illustration of a cosine diffuser element, according to many embodiments, situated in a weather station housing, according to many embodiments.

FIG. 4 is an illustration of a sensor housing containing a tiered cosine diffuser in a weather sensor station module 400 according to many embodiments. The tiered cosine diffuser 402 is situated within an opening of the sensor housing 404, the tiered cosine diffuser 402 and opening being oriented to the top of the sensor housing 404 in order to be exposed to the sun and receptive to light. The tiered cosine diffuser 402 is positioned within the sensor housing 404 such that it is relatively lower than a cutoff comb 406, which is a patterned ridge formed by the top surface of the sensor housing 404. In embodiments, a secondary sensor 408 can be mounted within a secondary sensor mounting 410, the secondary sensor 408 being a type of sensor that requires direct exposure to environmental conditions for its related measurements. In embodiments, mounting points 412 are present for securing the weather sensor station module 400 to a structure in the environment where weather monitoring is to be performed. Many embodiments may also have a UV sensor cable 414 that connects a UV sensor within the sensor housing 404 to a computer-readable media which can store, report, and/or analyze data collected by the UV sensor within the weather sensor station module 400.

The cutoff comb 406 regulates the amount of light incident on the tiered cosine diffuser 402 as the zenith angle of the incident light increases (again defining the direction normal 250 to the primary plane of the tiered cosine diffuser 402 as Θ=0°). The cutoff comb 406 presents prongs and slits as obstacles to light incident on the tiered cosine diffuser 402, through which incident light will be attenuated. The interference of the incident light thus alters the amount and intensity of the light as a function of Θ as it passes through the cutoff comb 406 structure and reaching the tiered cosine diffuser 402. Accordingly, the amount of light that is diffused through the tiered cosine diffuser 402 and reaches a UV sensor below the tiered cosine diffuser 402 and within the sensor housing 404 is dependent on the amount of light that passes through the cutoff comb 406 structure at high zenith angles.

Figure 5:
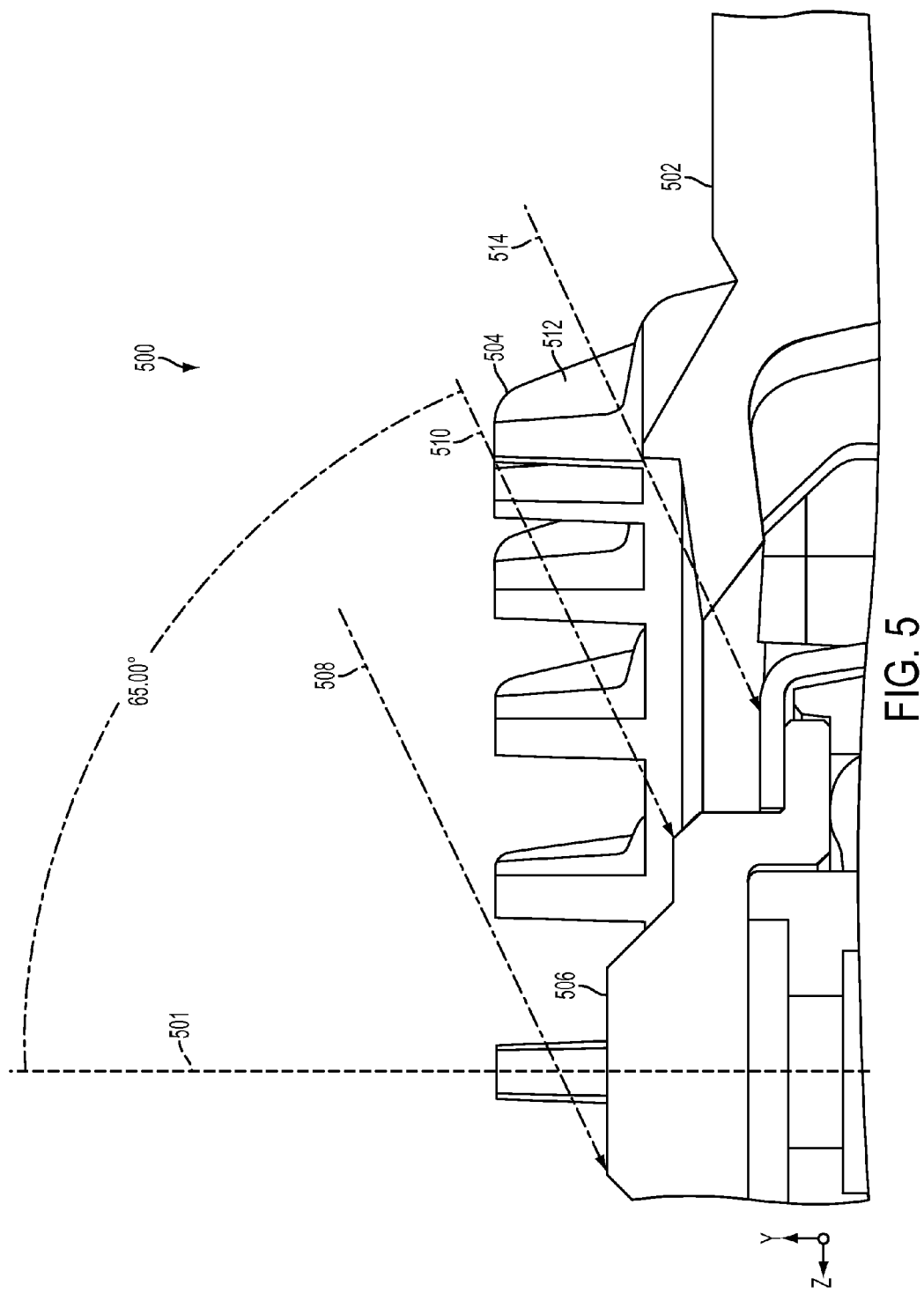
FIG. 5 is a detailed illustration of a weather station module sensor housing cutoff comb structure, according to many embodiments.

FIG. 5 illustrates a section of a weather station module 500 according to many embodiments having a sensor housing 502, a cutoff comb 504 and a tiered cosine diffuser 506 residing in an opening in the top surface of the sensor housing 502. Generally, as the zenith angle of the incident light increases, the light incident on the tiered cosine diffuser 506 reaches progressively fewer surfaces of the tiered cosine diffuser 506. In FIG. 5, the incident light is shown as striking the weather station module 500 at a zenith angle of Θ=65° (defining the direction normal 501 to the primary plane of the tiered cosine diffuser 506 as Θ=0°). Before the incident light at an increasing zenith angle is occluded and attenuated by the cutoff comb 504, the amount of light transmitted through the cosine diffuser 506 is 100% of the incident light. Exemplary light paths 508 and 510 represent the range of incident light unobstructed by the cutoff comb 504, at which 100% (i.e. the full strength) of the incident light is transmitted through the tiered cosine diffuser 506. When the incident light begins to be blocked in-part by the cutoff comb 504, the amount of light that passes through the cutoff comb 504, and thus to the cosine diffuser 506, is reduced from 100%. At a zenith angle of Θ=65°, incident light below exemplary light path 510 is only 75% of full strength of the incident light. Similarly, the amount of light along the exemplary light path 512 is only 73% of full strength of the incident light and the amount of light above the exemplary light path 514 is only 72% of full strength of the incident light. In embodiments, the cosine diffuser 506 is secured within the sensor housing 502 such that light along and above light path 512 reaches and is transmitted through the cosine diffuser 502, but light below light path 512 is blocked by a securing structure holding the tiered cosine diffuser 506 within the sensor housing 502. In such embodiments, no light below exemplary light path 512 reaches the tiered cosine diffuser 506, and thus the average light transmission that passes through the cutoff comb 504 between exemplary light path 510 and light path 514, and subsequently transmitted through the cosine diffuser 506, is 74% of full strength of the incident light.

In embodiments, the molding of the spaces or slits between the prongs of the cutoff comb 506 is tapered, such that the space between each prong of the cutoff comb 506 narrows toward the bottom of the prongs. The extent of the tapering can affect both the structural strength of the prongs as well as the light attenuation of the cutoff comb 506, and thus the related cosine response measured. In some embodiments, the individual prongs may be configured to have a T-shaped prong, where a first portion of the prong is constructed along the circumference of a cutoff ring ridge and the second portion of the prong juts out orthogonally to the first portion of the prong.

In embodiments, a cutoff comb 506 will be constructed to allow incident light to pass through and strike a cosine diffuser 502 with an average and relatively equal intensity in all directions of azimuth. In other words, the alternating prongs and openings of the cutoff comb 506 are distributed such that along any incremental portion of the cutoff comb 506, there is a ratio of open space (i.e. the slits between the prongs) to closed space (i.e. the space blocked by the prongs) that allows for an evenly distributed amount of light attenuation. In such embodiments, the pitch between the prongs of the cutoff comb 506 can be approximately half the diameter of the cosine diffuser 502, or less.

Figure 6:
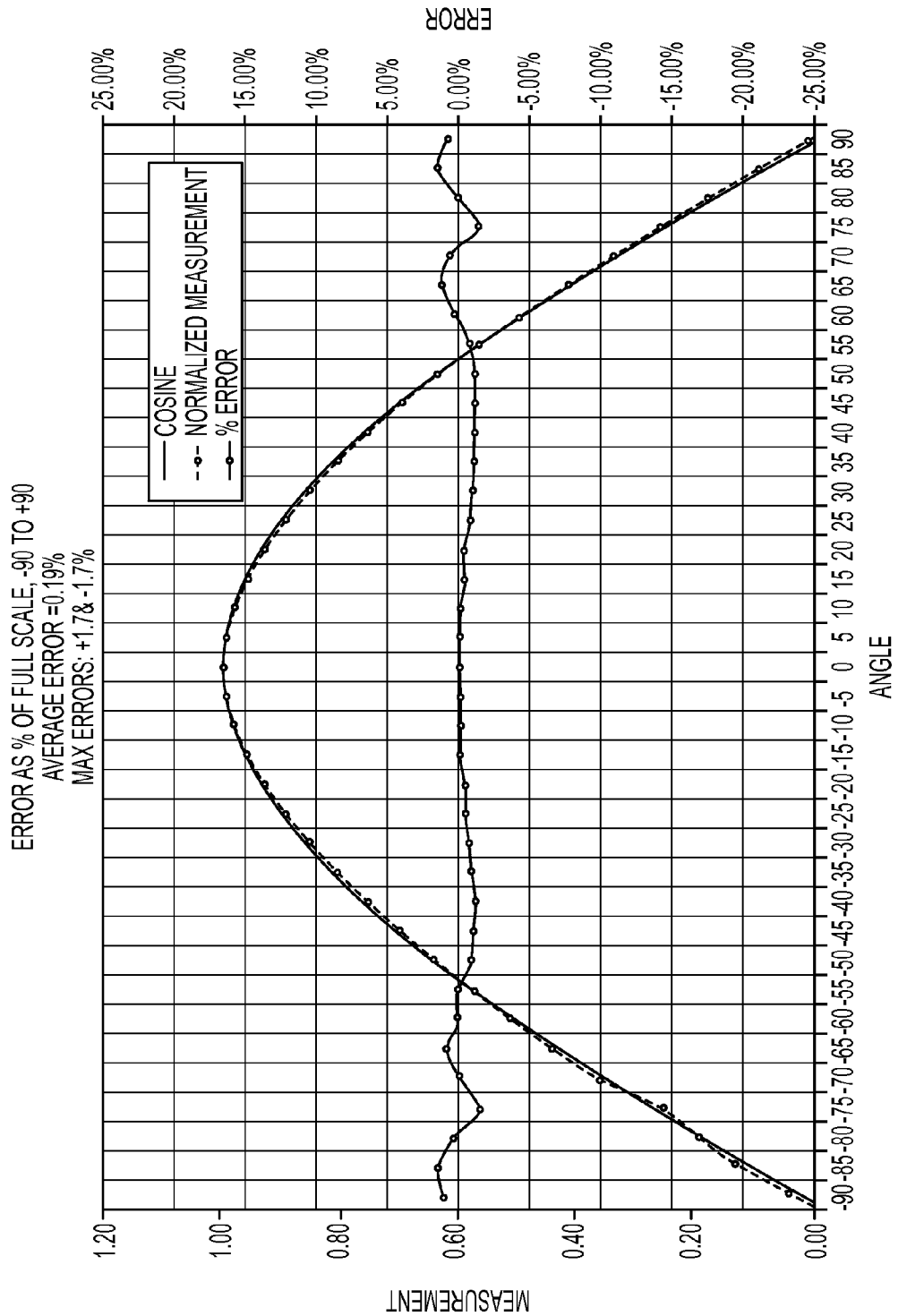
FIG. 6 is a graph comparing the percentage of error in UV light measurement of a cosine diffuser situated in a weather station module sensor housing with a cutoff comb structure as shown in FIG. 5, as compared to an ideal cosine response.

FIG. 6 is a graph illustrating a comparison of the cosine response between a sensor housing according to many embodiments with a cutoff comb as shown in FIG. 5 and an ideal cosine response as well as the percentage of error in measured UV light measurement. The measurement on the right side y-axis of the graph shows the percentage of error in UV light measurement. The measurement on the left side y-axis of the graph shows a normalized measurement of the intensity (i.e. irradiance) of the light by a UV sensor, the measured light having passed through a cutoff comb according to embodiments of the invention. The intensity is shown on a scale from 0.00 to 1.20 normalized to the peak value of the irradiance of the light. As evident from the graph, starting at an zenith angle of about 60° (viewed from either a positive or negative angle side), the amount of light received by the UV sensor is greater than the expected light that should be observed, creating an increasing false-positive error. This false positive error continues to increase to about 1.7% until around about $\Theta=75°$, where at this point, the cutoff ring begins to physically block the incident light from reaching the surfaces of the cosine diffuser. It is noted that this false-positive error is smaller in magnitude than the error seen in FIG. 3 which does not include a cutoff comb according to an embodiment of the invention. As the incident light begins to interact and attenuate as it passes through the cutoff comb, the amount of light sensed by the UV sensor falls, and the corresponding measurement similarly falls from being a false-positive error value (measuring more light than actually present) to a measuring a erroneously low value, a false-negative error of less than about negative 1.7%. Again, it is noted that this false-negative error is smaller in magnitude than the error seen in FIG. 3 which does not include a cutoff comb according to an embodiment of the invention. The average error, as a percentage of the full range of zenith angles from −90° to 90°, is an error of about negative 0.19%. This error is more pronounced at the extremes of the angle range.

FIGS. 7.1, 7.2, and 7.3 illustrate embodiments of segments of a cutoff comb where the comb has a sawtooth structure. In FIG. 7.1, a first sawtooth structure 700 has, over a repeating span, a first peak 702, a first vertex 704, a second peak 706, and a second vertex 708. In FIG. 7.2, a second sawtooth structure 710 has, over the span of one repeating segment, a first peak 712, a central vertex 714, and a second peak 716 (where the second peak 716 may be the first peak 712 of the following segment, and vice versa). In FIG. 7.3, a third sawtooth structure 720 has, over the span of one repeating segment, a first peak 722, a first vertex 724, a second peak 726, a second vertex 708, and a third peak 729 (where the third peak 729 may be the first peak 722 of the following segment, and vice versa). In some embodiments, the sawtooth structure can have twenty teeth equally distributed around the circumference of the cutoff comb, such that each repeating peak and vertex segment constitutes 18° of the circumference.

FIG. 8 illustrates a section of a weather station module 800 according to many embodiments having a sensor housing 802, a cutoff comb 804, and a tiered cosine diffuser 806 residing in an opening in the top surface of the sensor housing 802. The cutoff comb 804 illustrated in FIG. 8 represents an embodiment using the sawtooth design as disclosed in relation to FIG. 7. In FIG. 8, the incident light is shown as striking the weather station module 800 at a zenith angle of $\Theta=70°$ (defining the direction normal 801 to the primary plane of the tiered cosine diffuser 806 as $\Theta=0°$). The sawtooth cutoff comb 804 can have prongs or teeth having a height of 0.070 inches, measured from the base of a comb tooth defined by the intersection of the sawtooth comb 804 vertices to the top ridge of the sawtooth comb 804. Before the incident light at an increasing zenith angle is occluded and attenuated by the sawtooth cutoff comb 804, the amount of light transmitted through the cosine diffuser 806 is 100% of the incident light. Exemplary light paths 808 and 810 represent the range of incident light unobstructed by the sawtooth cutoff comb 804, at which 100% (i.e. the full strength) of the incident light is transmitted through the tiered cosine diffuser 806. When the incident light begins to be blocked in-part by the sawtooth cutoff comb 804, the amount of light that passes through the sawtooth cutoff comb 804, and thus to the cosine diffuser 806, is reduced from 100%. At a zenith angle of $\Theta=70°$, incident light below exemplary light path 810 is only 48% of full strength of the incident light. Similarly, the amount of light along the exemplary light path 812 is only 24% of full strength of the incident light and the amount of light below the exemplary light path 814 is reduced to 0% of the incident light. The average light transmission that passes through the sawtooth cutoff comb 804 between exemplary light path 810 and light path 814, and subsequently transmitted through the cosine diffuser 806, is 24% of full strength of the incident light. In embodiments, the angle of the vertex where the individual prongs of the sawtooth cutoff comb 804 meet is about 30°, or about 15° as measured from each side of the slope of the sawtooth structure.

In embodiments, a sawtooth cutoff comb 804 will be constructed to allow incident light to pass through and strike a cosine diffuser 806 with an average and relatively equal intensity in all directions of azimuth. In other words, the alternating prongs and openings of the sawtooth cutoff comb 804 are distributed such that along any incremental portion of the sawtooth cutoff comb 804, there is a ratio of open space (i.e. the slits between the prongs) to closed space (i.e. the space blocked by the prongs) that allows for an evenly distributed amount of light attenuation. In such embodiments, the pitch between the prongs of the sawtooth cutoff comb 804 can be approximately half the diameter of the cosine diffuser 806, or less.

Figure 9A:
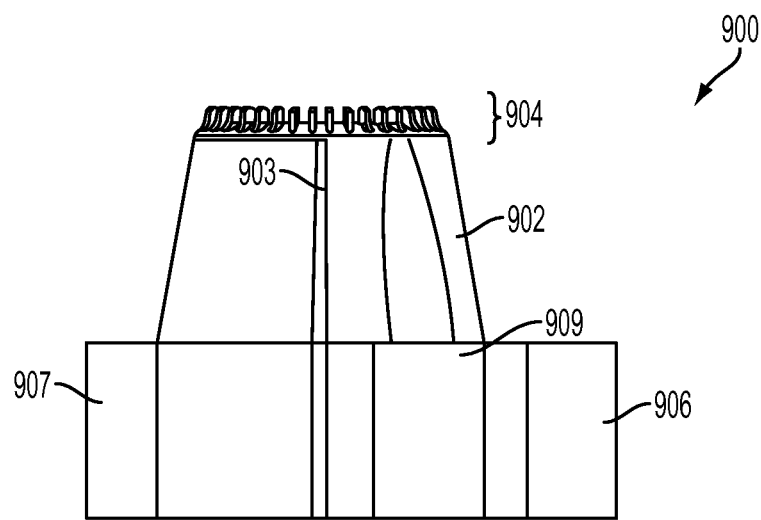
FIG. 9A is side perspective design schematic of a cutoff comb and weather station module sensor housing 900, according to many embodiments.

FIG. 9A is side perspective design schematic of a cutoff comb and weather station module sensor housing 900 according to an embodiment. In such an embodiment, the sensor housing 902 has a height from the base of the sensor housing to the bottom edge of the cutoff comb 904 of 1.92±0.01 inches. The sensor housing is molded to have an external secondary mounting 906 on one side of the sensor housing 902 flush with the base of the sensor housing 902, and a first sensor housing mounting point 907 also flush with the sensor housing 902 and directly opposite of the external secondary mounting 906. The sensor housing 902 additionally has a pair of molded external fin structures 903 located on either side of the sensor housing 902 perpendicular to the axis of symmetry. The external fins 903 can be used to aid in aligning the weather station with the direction of the incident irradiance.

Figure 9B:
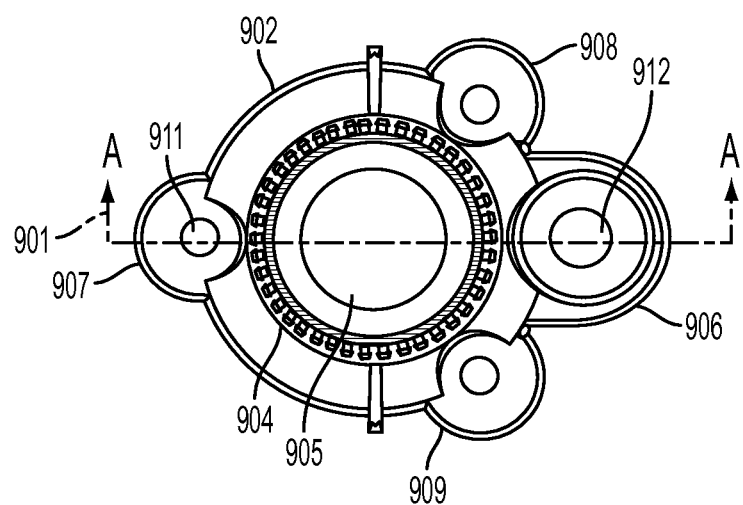
FIG. 9B is top perspective design schematic of a cutoff comb and weather station module sensor housing 900, according to many embodiments.

FIG. 9B is top perspective design schematic of a cutoff comb and weather station module sensor housing 900 according to an embodiment of the invention. The cutoff comb 904 is molded on the top of the sensor housing 902 and surrounds an upper opening 905 in the top of the sensor hosing 902. In such an embodiment as shown in FIG. 9B, the axis of symmetry 901 is represented by the plane A-A. In addition to the first sensor housing mounting 907 positioned opposite of the external secondary mounting 906, in an embodiment, the second housing mounting 908 and a third housing mounting 909 are positioned on the same side of the sensor housing 902 as the external secondary mounting 906, equidistant from each other and from the first housing mounting 907. The distance from the midpoint of the upper opening 905 to the midpoint of the midpoint of the first housing mounting 907 is 0.880±0.005 inches. The distance from the midpoint of the upper opening 905 to the midpoint of the second housing mounting 908 or third housing mounting 909, along the axis of symmetry 901, is 0.540±0.005 inches. The distance from the midpoint of the upper opening 905 to the midpoint of the second housing mounting 908 or third housing mounting 909, perpendicular to the axis of symmetry 901, is 0.770±0.005 inches. Similarly, the distance from the midpoint of the external secondary mounting 906, perpendicular to the axis of symmetry 901, to the midpoint of the second housing mounting 908 or third housing mounting 909 is 0.770±0.005 inches. The distance from the midpoint of the external secondary mounting 906, along to the axis of symmetry 901, to the midpoint of the second housing mounting 908 or third housing mounting 909 is 0.52±0.01 inches. Each sensor housing mounting has a hole in its center along the vertical axis of the sensor housing 902 to allow of a mounting structure to pass through, the diameter of the mounting holes 911 each being 0.184±0.005 inches. The external secondary mounting 906 similarly has an external secondary opening 912 vertical axis of the sensor housing 902 having a diameter of 0.30±0.01 inches. The sensor housing 902 can be further molded to have a generally cone-shaped structure, with curved indentations to allow for objects to easily fit into the mounting holes 911 and/or the external secondary opening 912.

Figure 9C:
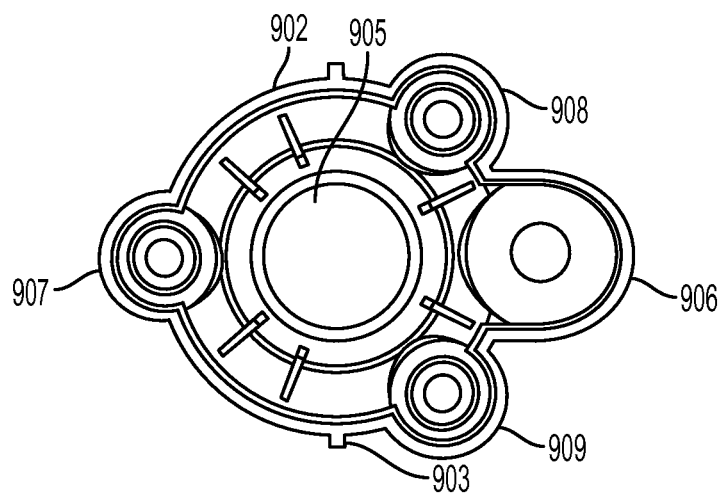
FIG. 9C is bottom perspective design schematic of a cutoff comb and weather station module sensor housing 900, according to many embodiments.

FIG. 9C is bottom perspective design schematic of a cutoff comb and weather station module sensor housing 900 according to an embodiment of the invention. In an embodiment, the sensor housing 902 is generally cone-shaped, and has a diameter from its center to the furthest exterior edge of the principal cone structure (i.e. the measurement not including the external secondary mounting or any of the housing mountings) of 1.82±0.01 inches. The molded fins 903 on the sensor housing 902 have a thickness of 0.07±0.01 inches, and the distance between the outermost points of the external fins 903, i.e. the width of the sensor housing 902 perpendicular to the axis of symmetry 901, is 1.98±0.01 inches.

Figure 9D:
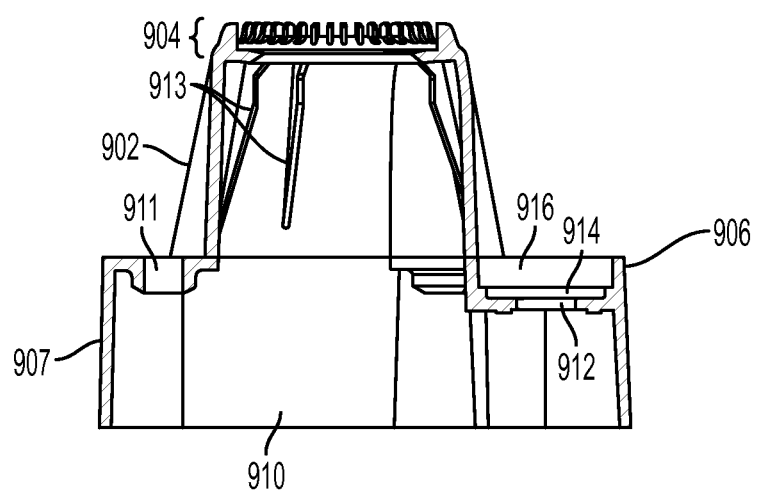
FIGS. 9D and 9E are cross-sectional side perspective design schematics of a cutoff comb and weather station module sensor housing 900, according to many embodiments.

FIG. 9D is a cross-sectional side perspective design schematic of a cutoff comb and weather station module sensor housing 900 according to an embodiment of the invention, the cross-section being along the along the axis of symmetry 901 represented in FIG. 9B as the plane A-A. The interior volume 910 of the sensor housing 902 is the hollow area in which sensors, such as a UV sensor, can reside, the sensor housing 902 acting as a protective shell to such sensors. Internal fin structures 913 are molded from the interior surface of the sensor housing 902, the internal fins 913 providing structural support to the overall sensor housing 902. The height from the base of the sensor housing 902 to the top of the cutoff comb 904 is 2.08±0.01 inches. The height from the base of the sensor housing 902 to the top of the external secondary mounting 906 is 0.88±0.01 inches. The height from the base of the sensor housing 902 to the top of each housing mounting 907, 908, and 909 is also 0.88±0.01 inches. The height from the base of each mounting hole 911 in each of the housing mountings to the top of the external secondary mounting 906 is 1.380±0.005 inches.

FIG. 9D further details that the external secondary mounting 906 is molded to have an external secondary opening 912, which is situated at the bottom of a two-stage cavity, having a first stage of the cavity 914 directly proximate to the external secondary opening 912, and the second stage of the cavity 916 directly proximate to the first sage cavity 914. In many embodiments, a sensor for a weather station that requires direct exposure to the ambient environment may sit within the two stage cavity, 914 and 916, connected to additional apparatus through a structure going through the external secondary opening 912. The distance from the bottom of the external secondary opening 912 to the base of the sensor housing 902 is 0.61±0.01 inches. The distance from the bottom of the first stage cavity 914 to the base of the sensor housing 902 is 0.67±0.01 inches. The first stage cavity 914 can have a diameter of 0.61±0.01 inches and a depth of 0.05±0.01 inches. The second stage cavity 916 can have a diameter greater than the diameter of the first stage cavity 914, as appropriate to hold an external secondary, where the second stage cavity 916 diameter is 0.70±0.01 inches and the distance from top of the second stage cavity 916 to the base of the sensor housing 902 is 0.88±0.01 inches (i.e. the height from the base of the sensor housing 902 to the top of the external secondary mounting 906). The distance from the interior wall surface of the main body of the sensor housing 902 distal to the exterior wall surface of the external secondary mounting 906 is 2.11±0.01 inches. The distance from the midpoint of the main body of the sensor housing 902 (which is in line with the center of the upper opening 905, as well as the point of intersection between the axis of symmetry 901 and the plane one which the external fins 903 reside) to the exterior wall surface of the external secondary mounting 906 is 1.50±0.01 inches. The distance from the interior wall surface of the main body of the sensor housing 902 proximate to the exterior wall surface of the external secondary mounting 906 is 0.85±0.01 inches.

Figure 9E:
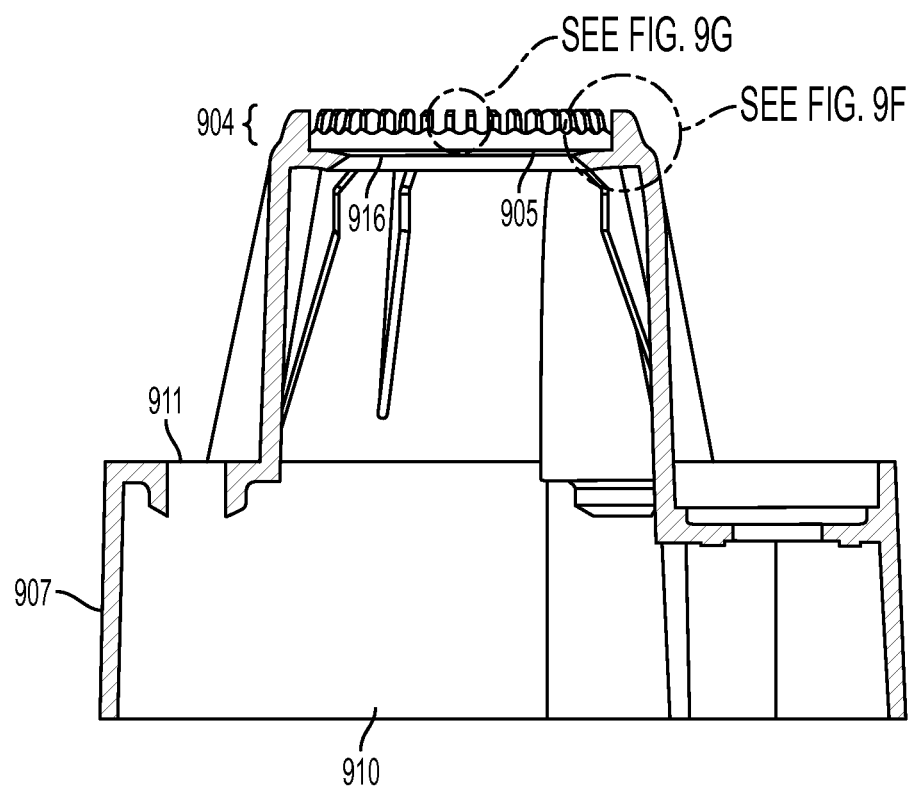

FIG. 9E is a cross-sectional side perspective design schematic of a cutoff comb and weather station module sensor housing 900 according to an embodiment of the invention, the cross-section being along the along the axis of symmetry 901 represented in FIG. 9B as the plane A-A. The first housing mounting 907 (as well as the second housing mounting 908 and the third housing mounting 909, though not shown in FIG. 9E) has a mounting hole 911 with an interior diameter of 0.18±0.01 inches. The molded structure forming the mounting hole 911 also has an exterior diameter of 0.31±0.01 inches. The molded structure of the mounting hole 911 forms a column that extends into the interior volume 910 of the sensor housing 902, where the outer edge of the bottom of that column can be cut at an angle, relative to the horizontal base of the sensor housing 902, of 30°±5°. The sensor housing 902 and defines an upper opening 905 which has a diameter of 0.74±0.01 inches. The upper opening 905 is located at the bottom of a cavity defined by the cutoff comb 904, the interior diameter of the cavity defined by the cutoff comb 904 being 1.014±0.005 inches. The portion of the sensor housing 902 forming the floor of the cavity 916 that extends from the base of the cutoff comb 904 to the edge of the upper opening 905 can be beveled to be at an angle equivalent to an zenith angle of 83°, where an zenith angle of 0° is equal to the vertical axis of the sensor housing 902. The interior wall surface of the cutoff comb 904 can also be molded to be at an angle of 2° from the vertical axis of the sensor housing 902. The width of the main body of the sensor housing can be 1.28±0.01 inches.

Figure 9F:
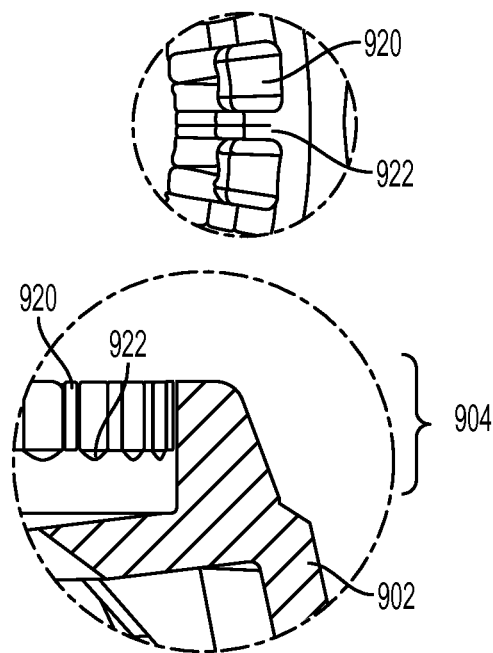
FIG. 9F is a detail section of FIG. 9E, specifically of the cutoff comb, showing both a side cross-section and top perspective of the cutoff comb, according to many embodiments.

FIG. 9F is a detail section of FIG. 9E, specifically of the cutoff comb 904, showing both a side cross-section and top perspective of the cutoff comb 904. The cutoff comb 904 is made of an alternating prong 920 and slit 922 structure, which is molded as a circular ridge along the top of the sensor housing 902. The pitch, height, and width of the prongs 920, and the corresponding depth and width of the slits 922, affect the attenuation effect of light incident that passes through the cutoff comb 904. The width of a slit 922 in the cutoff comb 904, and thus the distance between two prongs 920, is 0.025±0.005 inches.

Figure 9G:
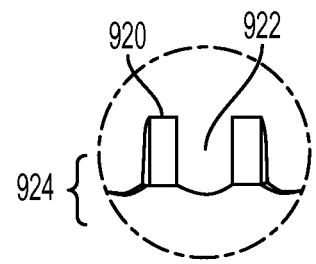
FIG. 9G is a detail section of FIG. 9E, specifically of the prong and slit structure of the cutoff comb, according to many embodiments.

FIG. 9G is a detail section of FIG. 9E, specifically of the prong and slit structure of the cutoff comb 904. The slits 922 of the cutoff comb 904 have a valley structure 924 which can be 0.010±0.005 inches in depth, measured from the base plane of the prongs 920 of the cutoff comb 904. The angle and shape of the valley structure 924 can also affect the attenuation effect of light incident that passes through the cutoff comb 904. The prongs 920 of the cutoff comb 904 can have a height, measured from the uppermost portion of the valley structure 924, of 0.070±0.005 inches.

Figure 10:
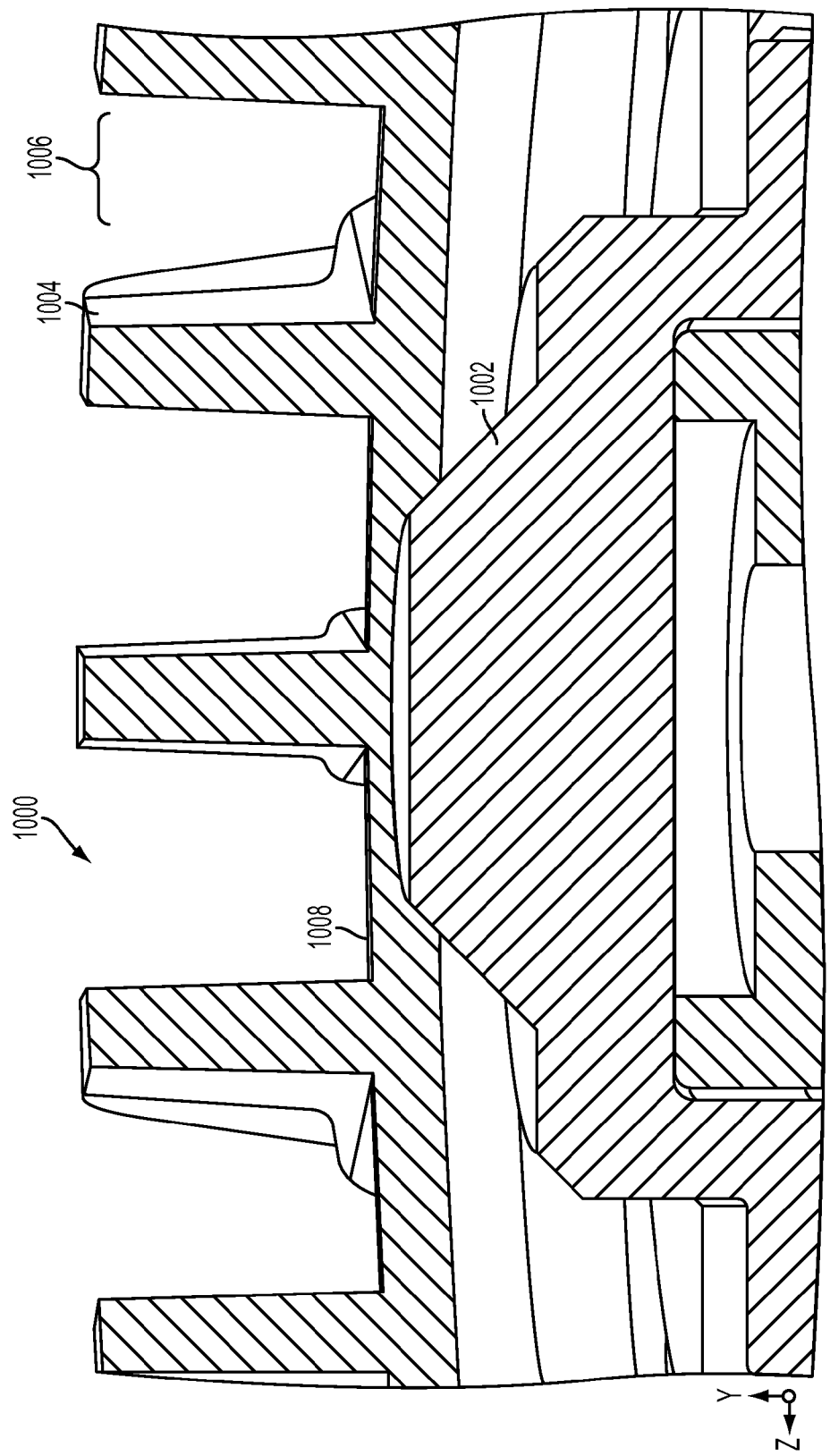
FIG. 10 is a detailed illustration of a weather station module sensor housing cutoff comb structure, according to many embodiments.

FIG. 10 is a detailed illustration of a weather station module sensor housing cutoff comb structure 1000 according to an embodiment of the invention. A tiered cosine diffuser 1002 according to such an embodiment resides within a housing structure, where incident light at certain zenith angles is interfered with by the cutoff comb structure 1000 made from prongs 1004 and slits 1006, connected where the prongs are connected by the base structure 1008 of the cutoff comb 1000. When the zenith angle of incoming light reaches the top of the cutoff comb structure 1000, identified as a first cutoff comb plane 1010, which defined by the top edges of the prongs 1004, about 75% of the incident light is transmitted past the cutoff comb structure due to attenuation effects. When the zenith angle of incoming light reaches the bottom of the prongs 1004, identified as a second cutoff comb plane 1012, which is also defined by the edges of the base structure 1008, about 72% of the incident light is transmitted past the cutoff comb structure due to attenuation effects. On average, about 73.5% of incident light passes through the cutoff comb structure 1000. In embodiments, the first cutoff comb plane 1010 is relatively higher than the top surface or uppermost portion of the cosine diffuser 1002. In other embodiments, the second cutoff comb plane 1012 is relatively lower than the top surface or uppermost portion of the cosine diffuser 1002.

In embodiments, the molding of the spaces or slits between the prongs of the cutoff comb structure 1000 is tapered, such that the space of a slit 1006 between each prong 1004 of the cutoff comb structure 1000 narrows toward the bottom of the prongs 1004. The extent of the tapering can affect both the structural strength of the prongs 1004 as well as the light attenuation of the cutoff comb structure 1000, thus the related cosine response measured. In some embodiments, at the top of the cutoff comb structure 1000, the individual prongs 1004 may have a width of about 0.036 inches, and each slit 1006 may have a width of about 0.110 inches. In such embodiments, while at the bottom of the cutoff comb structure 1000, the individual prongs 1004 may have a width of about 0.041 inches, and each slit 1006 may have a width of about 0.104 inches. In embodiments, the cutoff comb structure 1000 may have a height of about 0.120 inches, as measured from the base of the cutoff comb structure to its top.

In embodiments, a cutoff comb structure 1000 will be constructed to allow incident light to pass through and strike a tiered cosine diffuser 1002 with an average and relatively equal intensity in all directions. In other words, the alternating prongs 1004 and slits 1006 of the cutoff comb structure 1000 are distributed such that along any incremental portion of the cutoff comb structure 1000, there is a ratio of open space (i.e. the slits 1006) to closed space (i.e. the prongs 1004) that allows for an evenly distributed amount of light attenuation. In such embodiments, the pitch between the prongs 1004 of the cutoff comb structure 1000 can be approximately half the diameter of the cosine diffuser 1002, or less.

With these aspects in mind, it will be apparent from this description that aspects of the described techniques may be embodied, at least in part, in software, hardware, firmware, or any combination thereof. It should also be understood that aspects can employ various computer-implemented functions involving data stored in a data processing system. That is, the techniques may be carried out in a computer or other data processing system in response executing sequences of instructions stored in memory. In various aspects, hardwired circuitry may be used independently, or in combination with software instructions, to implement these techniques. For instance, the described functionality may be performed by specific hardware components, such as a specialized computer in communication with a photosensor located within a housing receiving sensory stimulus through a cosine diffuser, containing hardwired logic for performing operations, or by any combination of custom hardware components and programmed computer components. The techniques described herein are not limited to any specific combination of hardware circuitry and software.

The above description is illustrative and is not restrictive, and as it will become apparent to those skilled in the art upon review of the disclosure, that the present invention may be embodied in other specific forms without departing from the essential characteristics thereof. For example, any of the aspects described above may be combined into one or several different configurations, each having a subset of aspects. These other embodiments are intended to be included within the spirit and scope of the present invention. The scope of the invention should, therefore, be determined not with reference to the above description, but instead should be determined with reference to the following and pending claims along with their full scope of equivalents.

What is claimed is:

1. An ultraviolet (UV) sensor system, comprising:
   a sensor housing, where the sensor housing is formed of a sensor housing molding having an upper opening, wherein the sensor housing molding upper opening is shaped to have a ridge with a serrated structure that is a cutoff comb; and
   a cosine diffuser, where the cosine diffuser is situated within the upper opening of the sensor housing molding.

2. The ultraviolet (UV) sensor system according to claim 1, wherein the cosine diffuser further comprises:
   a high-angle tier, through which incident light enters the cosine diffuser at a first range of zenith angles;
   a low-angle tier, through which incident light enters the cosine diffuser at a second range of zenith angles;
   a base tier, though which incident light enters the cosine diffuser at third range of zenith angles; and
   a sensor cavity, though which light which has entered the cosine diffuser egresses from the cosine diffuser.

3. The ultraviolet (UV) sensor system according to claim 2, wherein the first range of zenith angles at which incident light enters the high-angle tier is about 90° or less.

4. The ultraviolet (UV) sensor system according to claim 2, wherein the second range of zenith angles at which incident light enters the low-angle tier is about 75° or less.

5. The ultraviolet (UV) sensor system according to claim 2, wherein the third range of zenith angles at which incident light enters the base tier is about 70° or less.

6. The ultraviolet (UV) sensor system according to claim 2, wherein the sensor cavity is configured to accommodate a photosensor.

7. The ultraviolet (UV) sensor system according to claim 1, wherein the sensor housing molding is shaped to have an interior space with which to shield a UV sensor.

8. The ultraviolet (UV) sensor system according to claim 1, wherein the sensor housing molding is configured such that when the cosine diffuser is situated in the upper opening of the sensor housing molding, a first plane of the ridge is relatively higher than an uppermost portion of the cosine diffuser and a second plane of the ridge is relatively lower than the uppermost portion of the cosine diffuser.

9. The ultraviolet (UV) sensor system according to claim 1, wherein the cutoff comb has a sawtooth structure.

10. The ultraviolet (UV) sensor system according to claim 1, wherein the cutoff comb has a prong and slit structure.

11. A sensor housing for an ultraviolet (UV) sensor system, comprising a molding shaped to have an interior space with which to shield a UV sensor, the molding having an upper opening which is configured to have a cosine diffuser situated therein, where the upper opening has a ridge with a serrated structure, such that the cosine diffuser is situated in the upper opening of the molding, where an uppermost plane of the serrated structure is relatively higher than an uppermost portion of the cosine diffuser.

12. The sensor housing according to claim 11, wherein the ridge with a serrated structure comprises a cutoff comb that has a sawtooth structure.

13. The sensor housing according to claim 11, wherein the ridge with a serrated structure comprises a cutoff comb that has a prong and slit structure.

14. A cosine diffuser for an ultraviolet (UV) sensor system, comprising:
   a high-angle tier, through which incident light enters the cosine diffuser at a first range of zenith angles;
   a low-angle tier, through which incident light enters the cosine diffuser at a second range of zenith angles;
   a base tier, though which incident light enters the cosine diffuser at third range of zenith angles; and
   a sensor cavity, though which light which has entered the cosine diffuser egresses from the cosine diffuser.

15. The cosine diffuser according to claim 14, wherein the first range of zenith angles at which incident light enters the high-angle tier is about 90° or less.

16. The cosine diffuser according to claim 14, wherein the second range of zenith angles at which incident light enters the low-angle tier is about 75° or less.

17. The cosine diffuser according to claim 14, wherein the third range of zenith angles at which incident light enters the base tier is about 70° or less.

18. The cosine diffuser according to claim 14, wherein the sensor cavity is configured to accommodate a photosensor.

* * * * *